United States Patent [19]
Martin

[11] 3,837,400
[45] Sept. 24, 1974

[54] SELECTIVE PLUGGING PROCESS
[76] Inventor: Waylan C. Martin, P.O. Box 1468, Monahans, Tex. 79756
[22] Filed: Dec. 15, 1972
[21] Appl. No.: 315,655

[52] U.S. Cl. .................... 166/274, 166/292
[51] Int. Cl. ............... E21b 33/138, E21b 43/22
[58] Field of Search .......... 166/292, 285, 273, 274, 166/270

[56] References Cited
UNITED STATES PATENTS

| | | | |
|---|---|---|---|
| 2,042,011 | 5/1956 | Loomis | 166/292 |
| 2,156,220 | 4/1939 | Dunn | 166/292 |
| 2,272,672 | 2/1942 | Kennedy | 166/270 |
| 2,747,670 | 5/1956 | King et al. | 166/270 |
| 2,807,324 | 9/1957 | King et al. | 166/292 |
| 2,837,163 | 6/1958 | Ramos et al. | 166/292 X |
| 3,530,937 | 12/1968 | Bernard | 166/292 X |

Primary Examiner—Stephen J. Novosad
Attorney, Agent, or Firm—Wendell Coffee

[57] ABSTRACT

Channels in a water flood oil zone are plugged by injection of a hydroxide solution such as sodium hydroxide. The hydroxide solution is isolated from the magnesium bearing connate water in the vicinity of the wellbore by an isolating slug of low magnesium water.

4 Claims, 3 Drawing Figures

PATENTED SEP 24 1974
3,837,400
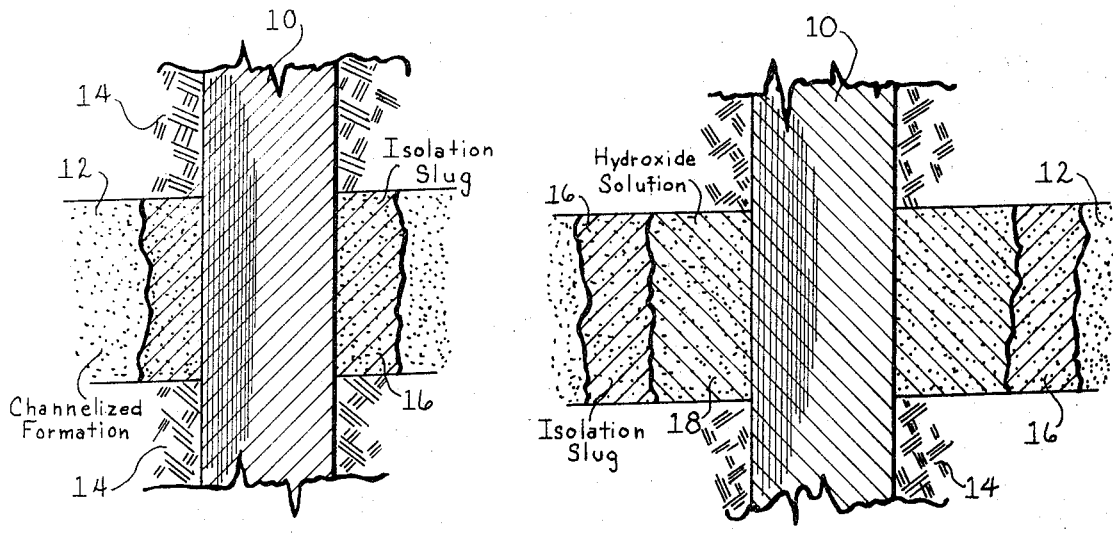
FIG-1
FIG-2
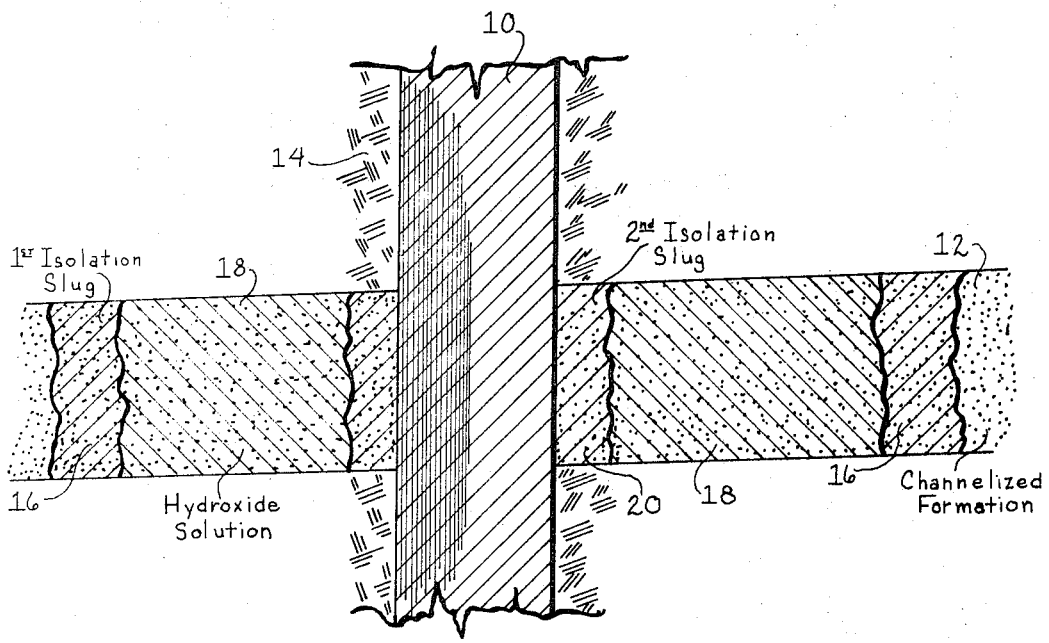
FIG-3

3,837,400

SELECTIVE PLUGGING PROCESS

BACKGROUND OF THE INVENTION:

1. Field of the Invention.

This invention relates to water flood oil wells and more particularly to introducing a material to chemically interact in the formation to produce a plugging precipitate in situ.

2. Description of the Prior Art.

Water flooding in oil field production is a well known process.

When a producing oil well is first drilled, generally, there will be sufficient excess of petroleum to flow into the well where it can be brought to the surface by existing pressure within the well or by pumps. After a certain length of production, the petroleum no longer flows into the producing well. Additional oil can be produced from the zone by water flood process.

Basically the water flood process is: water is injected into the zone in one well and then the water pushes the oil through the zone to another well from which the oil is pumped to the surface.

During this process, channelization may occur. The water, instead of flooding the entire formation, may form channels through the zone and go almost directly from the injection well to the producing well so mostly water is pumped from the producing well instead of oil.

Many oil bearing formations include connate water and this connate water has soluble magnesium salts therein such as magnesium chloride.

Previous workers in the field have sought to form a precipitate within underground formations by injecting a sodium hydroxide solution and then injecting a spacer slug of water and finally injecting a second slug of material such as ferric chloride. Others have used aluminum salts to precipitate aluminum hydroxide when using a hydroxide.

According to the best of my knowledge, all previous workers have used two injected reactants.

The following U.S. patents were considered in preparing this application:

| | |
|---|---|
| Kennedy | 2,272,672 |
| Chamberlain | 2,238,930 |
| King | 2,747,670 |
| Ramos et al. | 2,837,163 |
| Bernard et al. | 3,185,214 |
| Eaton | 3,396,790 |
| King et al. | 3,342,262 |

SUMMARY OF THE INVENTION:

1. New and Different Function.

I have discovered that it is profitable to plug the channels within the formation by using the connate water. Therefore, according to my process, an isolating slug of water containing practically no magnesium is first injected into the injection well then a considerable quantity of sodium hydroxide is injected. The sodium hydroxide will not contact the magnesium-containing connate water until it has penetrated the isolation slug of water which will be some distance from the wellbore and, therefore, there will be no plugging precipitate in the immediate vicinity of the injection bore. However, thereafter the injected sodium hydroxide solution will mix with the magnesium salts to form a magnesium hydroxide precipitate which precipitate obviously forms along the normal fluid-carrying channels. It is these channels which are desired to be plugged and the precipitate will plug these channels. I.e., where most of the sodium hydroxide solution is carried are the very places desired to be plugged and, therefore, this is where the plugging will occur.

Immediately after the sodium hydroxide solution is injected, the water flooding can be resumed if the water used to flood will not form a hydroxide precipitate. However, in many instances the oil bearing zone is being flooded with a salt water which may contain magnesium or other ions which will form an insoluble precipitate. In such an event, it is necessary to inject an additional isolating slug of low magnesium water after the sodium hydroxide solution has been injected. This process may also be applied to a producing oil well in the same manner. In this application the precipitated magnesium hydroxide will function to prevent the entry of connate water into the wellbore of the producing well that has been treated.

One of the additional benefits of this invention is the precipitate formed, which is the magnesium hydroxide, is reactable with acid so if an undesirable plug does form, it could be removed by conventional, well known acid treatment.

In addition to the plugging processes, it is known that the sodium hydroxide will clean oil from the formation surfaces and thereby release oil so it flows to the production well.

2. Objects of this invention.

An object of this invention is to increase oil production from underground formations.

Another object is to plug channels which have formed in water flooded oil bearing zones.

Other objects are to achieve the above with a method that is versatile, rapid, efficient, and inexpensive, and does not require comples machinery nor skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING:

FIG. 1 is a schematic representation of an injection well in an underground zone.

FIG. 2 is a schematic representation of the well and zone of FIG. 1 with the hydroxide solution being injected.

FIG. 3 is a schematic representation of the well and zone after completion of the hydroxide injection.

DESCRIPTION OF THE PREFERRED EMBODIMENT:

Referring more particularly to FIG. 1 of the drawing, there may be seen as injection well and, particularly, bore 10 which intersects the oil zone 12 which has been channelized. Normally, the oil bearing zone is between two impervious formations 14. As the first step in this procedure, an isolation slug 16 of low magnesium or magnesium free water is injected into the zone to prevent contact between the hydroxide solution and any connate water which might be around the injection well. It is important that the precipitate not form immediately at the injection well or there might be complete plugging immediately around the injection well. Then, the zone 12 would no longer take flood water which would defeat the basic purpose.

The isolation slug of water 16 is referred to herein as "low magnesium" water. It will be understood that it would be preferable to use magnesium free water, however, as a practical matter this is not necessary even if possible as a technical matter. It is necessary that the isolation slug 16 also be low in other ions which will form a hydroxide precipitate.

After an isolation slug 16 of low magnesium water has been injected, a sodium hydroxide solution 18 is injected. It will be understood that any or many soluble hydroxide solutions could be used, however, sodium hydroxide is preferred. It is preferred because of its ready availability, low cost, and, also, because it has a cleaning action, cleaning the oil from the surfaces within the zone 12. It will be noted that as the hydroxide solution 18 is injected, the isolation slug 16 becomes thinner. Inasmuch as the water is in a constantly expanding circle in the zone 12, the fixed amount of isolation slug of water becomes thinner and thinner. Of course, it is only a question of time or distance before the isolation plug 16 completely breaks down so the hydroxide solution 18 comes in contact with the magnesium salts within the connate water. At that time, an insoluble magnesium hydroxide precipitate is formed within the zone 12.

Immediately after the injection of the hydroxide solution 18, it is desirable to immediately resume pumping flood water into the zone.

Normally, there will not be sufficient magnesium or other precipitate forming ions in the flood water to cause any problem. However, in some cases where there might be more magnesium in the flood water, there would be an excess of magnesium hydroxide formed within the wellbore 10 itself. The precipitate would be pumped out into the zone 12 immediately surrounding the bore where other precipitate would also be formed within the zone. Then it is desirable to use second isolation slug 20 of low magnesium water. Then, immediately behind the second isolation slug of low magnesium water, the regular flood water is immediately pumped to push the hydroxide solution 18 on through the formation where it reacts with the magnesium bearing connate water as described above.

Therefore, it may be seen that I have achieved the objective of this invention to advantageously plug the channels within an oil producing zone.

The embodiments shown and described above are only exemplary. I do not claim to have invented all the elements or steps described. Various modifications can be made in material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to use the invention.

I claim as my invention:

1. In an oil bearing zone being water flooded
  a. said zone containing connate water with
  b. soluble magnesium salts therein;
  c. the method of plugging water channels therein comprising the steps of:
  d. injecting an aqueous solution of a hydroxide therein,
  e. isolating said hydroxide solution from the connate water near the point of injection and thereafter,
  permitting the mixture of the hydroxide solution and connate water, thus
  g. forming insoluble magnesium hydroxide, thereby
  h. plugging said channels therewith,
  j. resuming injection of flood water after injecting the hydroxide solution, and
  k. isolating said hydroxide solution from the resumed injection of flood water.

2. The invention as defined in claim 1 wherein said isolation of said hydroxide solution by first
  m. injecting low magnesium water.

3. The invention as defined in claim 2 with an additional limitation of
  n. said hydroxide solution being sodium hydroxide.

4. The invention as defined in claim 3 with an additional limitation of
  o. said hydroxide solution also cleaning oil from the formation in the zone before reacting with said magnesium salts.

* * * * *